US012581137B2

(12) United States Patent
Hird

(10) Patent No.: US 12,581,137 B2
(45) Date of Patent: Mar. 17, 2026

(54) VIDEO MANAGEMENT SYSTEM FOR VIDEO FILES AND LIVE STREAMING CONTENT

(71) Applicant: Arivo Entertainment, LLC, Salt Lake City, UT (US)

(72) Inventor: Stephen Hird, Cary, NC (US)

(73) Assignee: Arivo Entertainment, LLC, Salt Lake City, UT (US)

( * ) Notice: Subject to any disclaimer, the term of this patent is extended or adjusted under 35 U.S.C. 154(b) by 102 days.

(21) Appl. No.: 18/465,086

(22) Filed: Sep. 11, 2023

(65) Prior Publication Data

US 2024/0223821 A1 Jul. 4, 2024

Related U.S. Application Data

(60) Provisional application No. 63/488,121, filed on Mar. 2, 2023, provisional application No. 63/405,312, filed on Sep. 9, 2022.

(51) Int. Cl.
*H04N 21/2187* (2011.01)
*H04N 21/231* (2011.01)

(52) U.S. Cl.
CPC ... *H04N 21/2187* (2013.01); *H04N 21/23113* (2013.01)

(58) Field of Classification Search
CPC ......... H04N 21/2187; H04N 21/23113; H04N 21/26258; H04N 21/23109; H04N 21/234309; H04N 21/23439; H04N 21/2541
See application file for complete search history.

(56) References Cited

U.S. PATENT DOCUMENTS

| | | | |
|---|---|---|---|
| 2007/0094583 A1* | 4/2007 | Randall ............... | H04N 19/154 |
| | | | 375/E7.129 |
| 2008/0007651 A1* | 1/2008 | Bennett ................. | H04N 7/173 |
| | | | 348/E7.06 |
| 2015/0074706 A1* | 3/2015 | Hao ................ | H04N 21/26258 |
| | | | 725/24 |
| 2021/0352347 A1 | 11/2021 | Arora | |
| 2024/0040171 A1* | 2/2024 | Chen ................... | H04N 21/251 |

* cited by examiner

*Primary Examiner* — Michael R Telan
(74) *Attorney, Agent, or Firm* — MORRISS O'BRYANT COMPAGNI CANNON, PLLC

(57) ABSTRACT

The present invention is a system and method for providing a single video management system for managing both live streaming and video file media content, wherein the video management system will receive any readable media content, process it to generate the highest quality output media file based on the source media file, apply security as directed by the content owner, manage the storage and retention of the output media file for the duration of time needed, and then remove the output media file once the duration of availability of the output media file has expired.

10 Claims, 8 Drawing Sheets

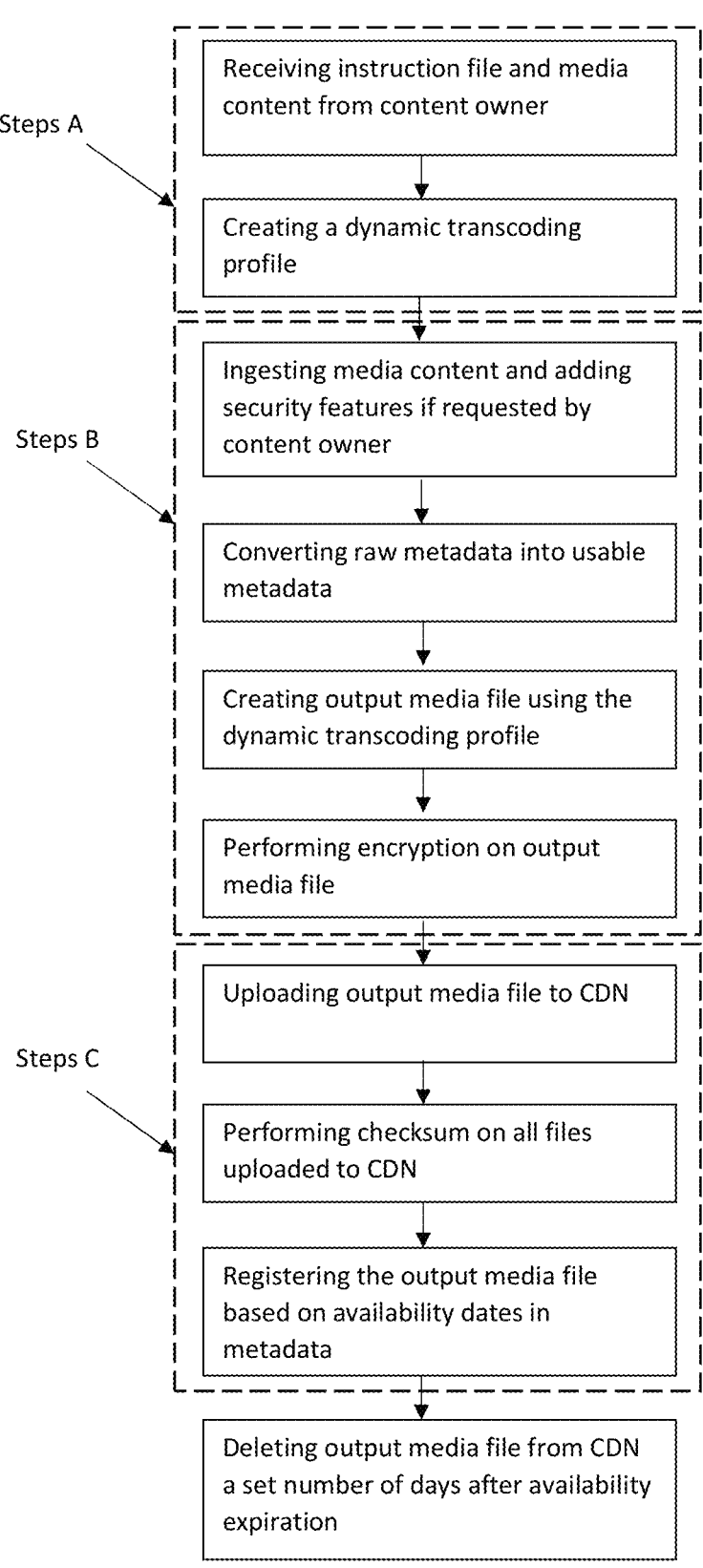

Steps A

Receiving instruction file and media content from content owner

Creating a dynamic transcoding profile

Steps B

Ingesting media content and adding security features if requested by content owner Converting raw metadata into usable metadata Creating output media file using the dynamic transcoding profile Performing encryption on output media file Steps C Uploading output media file to CDN Performing checksum on all files uploaded to CDN Registering the output media file based on availability dates in metadata Deleting output media file from CDN a set number of days after availability expiration

FIGURE 1

TABLE 1

<<720_filename>>.mp4 (1280 x 720, DASH Video)
<<504_filename>>.mp4 (896 x 504, DASH Video)
<<432_filename>>.mp4 (768 x 432, DASH Video)
<<360_filename>>.mp4 (640 x 360, DASH Video)
<<216_filename>>.mp4 (384 x 216, DASH Video)
<<720_filename>>.ts (1280 x 720, HLS Video)
<<504_filename>>.ts (896 x 504, HLS Video)
<<432_filename>>.ts (768 x 432, HLS Video)
<<360_filename>>.ts (640 x 360, HLS Video)
<<216_filename>>.ts (384 x 216, HLS Video)
<<128_eng_filename>>.mp3 (768 x 432, Audio english)
<<128_esp_filename>>.mp3 (768 x 432, Audio spanish)
<<eng_subtitles_filename>>.srt (768 x 432, subtitles english)
<<esp_subtitles_filename>>.srt (768 x 432, subtitles spanish)
<<fre_subtitles_filename>>.srt (768 x 432, subtitles french)
<<filename>>.mpd (DASH Manifest)
<<filename>>.m3u8 (HLS Manifest)

FIGURE 7

VIDEO MANAGEMENT SYSTEM FOR VIDEO FILES AND LIVE STREAMING CONTENT

BACKGROUND

Field of the Invention

This invention relates generally to management of video. More specifically, the invention relates to the management of both video files and live streaming content for content owners that wish to make the content available for viewing for select periods of time, managing the transfer of content to a system, the receipt of instructions as to what should be done with the content, the processing of the content to prepare it for viewing, the storage of the content while it is available for viewing, and the removal of the content from the system after the period of viewing is over.

Description of Related Art

The nature of media viewing has changed rapidly as both video files and live streaming content are being made available online and on different devices. Online viewing has come to mean the streaming of media that is delivered over a network such as the Internet, regardless of whether that media is being streamed live or is a recorded video file. For the purposes of this document, media content may be from the streaming of live programming, providing video files on demand (VOD), and playback of digitally recorded video (DVR).

Video streaming services provided by a streaming service provider may enable viewers to stream live programming, which includes traditional television channels being broadcast over air or over cable, to watch video on demand, or to stream both types of media content. However, it is not hard to imagine that managing media content is a complicated process for various reasons.

First, media content has been created and continues to be created in many different formats. These formats may differ from each other in such things as video resolution, audio format, etc. For example, video files may be formatted in 240p, 360p, 480p, 720p, 1080p, 4K resolutions, etc. Likewise, there are various audio formats such as Dolby Digital 2.0, Dolby Digital 5.1, Dolby Atmos, etc.

When media content is sent to the streaming service provider, it must be prepared for viewing by customers of that service. The media content may be processed or transformed into a format that is suitable for streaming from the service. Specifically, this document may generically refer to the "processing" of audio and video that together comprise the media content.

The difficulty in dealing with the numerous video and audio formats has resulted in the streaming service provider industry forcing the processing of the different video and audio formats into a single selected video and audio format. This processing may be performed using a hard-wired system that only generates a predefined and invariable video and audio output format, regardless of the incoming audio and video format, and regardless of the quality of a resulting output media file.

Managing media content is also complicated because the streaming service provider industry has typically regarded the management of live streaming and video files as very different activities that require different tools. Thus, live streaming and video files are managed and processed by separate video management systems.

Accordingly, it would be an advantage over the prior art to simplify the process of managing live streaming and video on demand media content by providing a video management system that can manage both types of media. It would be a further advantage to provide an output media file that is the highest quality that can be obtained, and not forcing all media content to have the same video and audio format in the resulting output media file.

BRIEF SUMMARY

The present invention is a system and method for providing a single video management system for managing both live streaming and video file media content, wherein the video management system will receive any readable media content, process it to generate the highest quality output media file based on the source media file, apply security as directed by the content owner, manage the storage and retention of the output media file for the duration of time needed, and then remove the output media file once the duration of availability of the output media file has expired.

These and other embodiments of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 1 is a flowchart of the method of using the first embodiment of the invention showing the method of transforming raw media input files (the readable media content or input file) to create an output media file and storing for viewing.

FIG. 7 is a list showing the contents of a standard adaptive stream file set.

DETAILED DESCRIPTION

Figure 2:
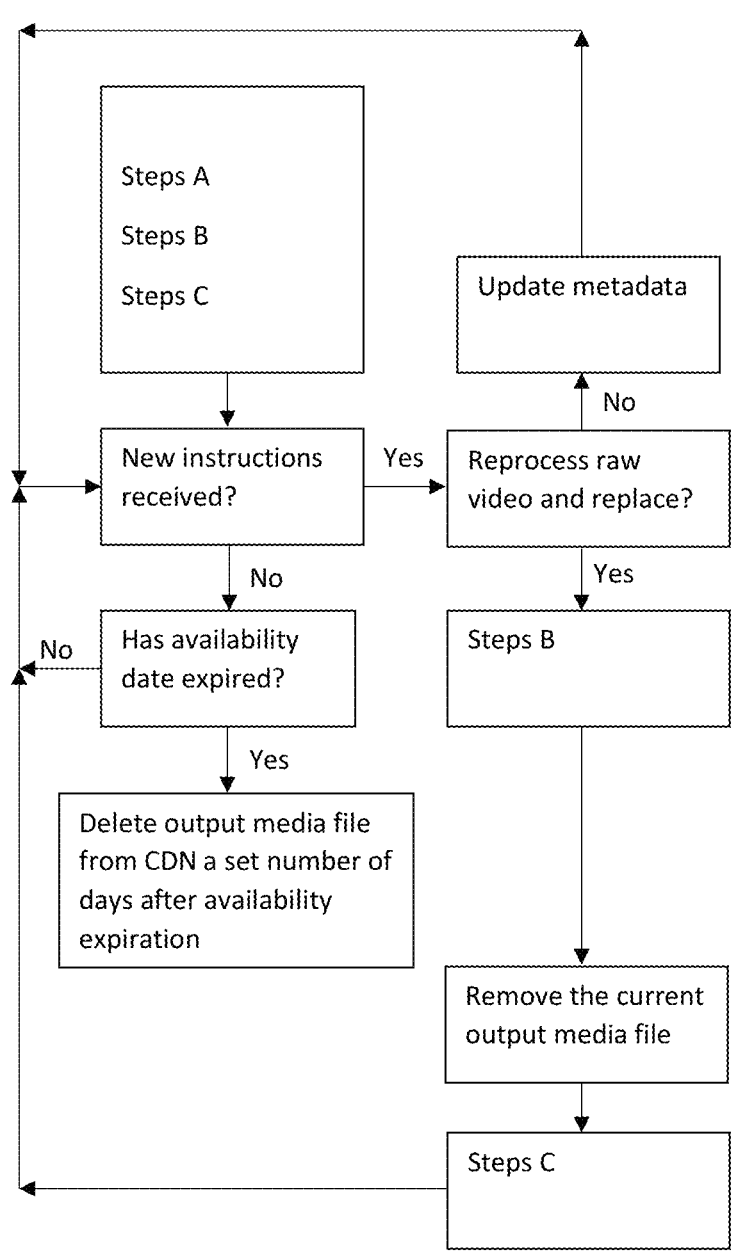
FIG. 2 is a modified version of the method shown in FIG. 1 but now showing the steps of updating an output media file or metadata when modified readable media content is received.

Reference will now be made to the drawings in which the various embodiments of the present invention will be discussed so as to enable one skilled in the art to make and use the invention. It is to be understood that the following description illustrates embodiments of the present invention and should not be viewed as narrowing the claims which follow.

The first embodiment of the present invention is a video management system that provides a full workflow path for a streaming service provider to manage media content that is provided to it by media content owners for streaming from the service. The full workflow path of the first embodiment works with both live streaming media content and video files that may be viewed on demand (VOD). The first embodiment may provide innovation by the overall process as well as by some of the individual components of that process.

The video management system is a holistic group of tools that work together to receive raw media input files, transform them to a usable output media format, and then secures, monitors, manages, gathers viewership statistics, and reports back on the status of the output media file and then removes the output media file from the system after the duration of availability has expired.

The first improvement of the first embodiment over the prior art is that the video management system integrates management of both live streaming content and video file content. The prior art fails to provide this service because the two types of media are perceived as being so different that a single management system is not capable of providing management of both. The first embodiment teaches how the different media types may be managed by a single video management system. The higher cost of implementing and supporting two different video management systems is thus avoided.

An overview of the first embodiment is useful before examining the details of implementation. The management portion of the video management system may consist of managing the streaming company/content owner information. This includes performing system setup for transfer of raw media files, metadata information consumption and most critically, creating dynamic transcoding profile settings. The use of dynamic transcoding profiles may be a distinct advantage over the prior art.

The video management system handles management and direction of the transcoding process of raw media input files. All dynamic transcoding profiles are applied based on the raw media files to ensure quality and integrity of both audio and video. Security is applied to the output media file as needed and directed by the content owner (interchangeably addressed as the client).

The first embodiment of the video management system also manages the storage and retention of output media files. Based on content owner directions, output media files are retained only for the duration of time needed. This is because content is typically only available for a limited period of time as determined by the content owner. Management of protected files, streaming assets and other media assets is done by the video management system in accordance with settings and configurations that are set by the content owner.

Due to the absence of standardization of video and audio formats, the video management system may transform raw media input files received by the various content owners into a standardized format. This format may be useable by all apps and operating systems. This includes all metadata for media titles, channel listing schedules, and digital ad insertion (DIA).

The video management system may handle live streaming and on-demand video streaming. All channel management for streams (including traditional sources such as broadcast television and cable television distribution), sourcing, and security may be managed in the video management system. This includes pulling in various listing data in different formats, and compiling to a single, standardized format. Video On Demand (VOD) catalog management also handles various formats of metadata to standardize the data in order to deliver to customer-facing applications.

Not only are these media types managed by a single video management system, but it also performs improved raw media input file ingestion, versatile instruction receipt from the content owner, raw metadata translation to usable metadata, and creation of a dynamic transcoding profile. The video management system is capable of adjusting dynamic transcoding profiles in real-time based on the raw media input file that was delivered. After transcoding is complete, the output media file may be uploaded to a content delivery network (CDN) for storage and user access. This document now looks at individual steps in the workflow of the video management system.

Dynamic transcoding profiles are an adaptive or progressive streaming profile. Using a dynamic transcoding profile enables the video management system to preserve the highest quality of video resolution and audio format that is possible for any given raw video. For example, a high quality video and/or audio format is not automatically reduced to an inferior video and/or audio format just for the sake of making all output media files have the same format as in the prior art.

One of the most important aspects of the first embodiment is the process of raw media input file ingestion or input into the video management system. The prior art appears to lack versatility in the nature of the data that can be delivered to a video management system. It is understood in the video stream services industry that a specific video format needs to be delivered to the streaming service provider for ingestion. Furthermore, after receipt the second step that the prior art performs is to upscale or downscale all raw media input files to a predetermined desired output media file format. This important step in the prior art typically reduces the quality of the output media files and is not performed by the first embodiment.

For example, the content owner sends a streaming service provider a raw media input file that has a resolution of 720p and an audio format of Dolby Digital 2.0. Disadvantageously, the prior art system is hard-wired to always produce an output media file having only one video and one audio format. Typically, the output format of the prior art will be video at 1080p resolution and audio having a Dolby Digital 5.1 format.

The drawback of upscaling or downscaling all raw media input files in both video resolution and audio output is that when lower resolution video and audio files are forced to be upscaled, the resulting output media file is of substantially poor video and audio quality. In addition, if the quality of the raw media input files is above the preselected output media file format, downscaling the format will lose the original high quality. Thus, this poor output quality of the output media file can happen for various reasons.

For example, the hard-wired method of importing audio does not work the same for all audio formats. The result is often the amplification of background noise and the muffling of primary audio channels. In other words, only a single solution is provided in the prior art despite the existence of multiple audio formats. Likewise, upscaling a lower resolution video file will most likely result in a very poor quality of video in the output media file.

In contrast, raw media input file ingestion in the first embodiment is performed very differently. First, upscaling and downscaling is never automatic. The output media file of the first embodiment may be at any desired video resolution and have audio formatted in any known desired format. The criteria for selecting a video resolution and an audio format for the output media file is the result of an evaluation that is performed of the raw media input file. The video management system of the first embodiment selects an output format for video and audio that will result in the highest quality output that is possible. Thus, the first embodiment of the invention does not have a predetermined hard-wired output format, and that is a substantial improvement over the prior art.

For example, a raw media input file of 480p resolution with a Dolby Digital 2.0 audio format may be ingested and create a processed output media file that is still at a resolution of 480p with a Dolby Digital 2.0 audio format. The original video and audio formats are preserved because changing them would most likely result in an inferior media output file. However, the video resolution or the audio format may be changed. What is important to recognize is that the video management system will select whichever video and audio formats that will result in the highest quality of output media file based on the raw video that was received. Upscaling the Video format would reduce the quality of the output media file.

It should be understood that a reduction in quality means a reduction in video or audio quality making the resulting output media file more difficult to see and/or hear.

The video management system may also evaluate the resulting output media file. If it determines that the output media file quality is not equal to or an improvement over the raw media input file, the video management system may make adjustments in real-time and modify the transformation of the raw media input file.

Another advantageous aspect of the first embodiment is that the video management system does not specify what type of file must be submitted by the content owner. Instead, the first embodiment only requires that the raw media input file be readable. The video management system may accept any readable raw media input file and then transform it to a useable format. Thus, the first embodiment of the invention includes the ability to take any type of file that it is given and generate a same or improved output media file.

The step of ingestion is also the step of converting raw metadata associated with the raw media input file to a usable metadata format. However, the prior art requires that a specific format be used such as an XML schema in order for the raw metadata to be imported for conversion.

In contrast, the first embodiment may not require the metadata to be in any specific format. The video management system may extract whatever raw metadata is in the raw media input file and then convert it to a desired and usable metadata format. The metadata may be configured to use XML, JSON, or Web Endpoints to automatically translate the raw metadata to usable metadata in front-end systems. Some aspects of translation of metadata are that translation of metadata fields from a single example may be saved for future deliveries of raw media input file. Raw media input file fields may also be concatenated into a single field. Finally, raw media input file fields may be parsed to multiple fields.

It should be understood that metadata is not limited to information such as a title, but everything that may have to do with transcoding the data into the desired output format. An advantageous aspect of the video management system is that it learns. Thus, once the video management system has received and processed a raw media input file for the first time for a particular content owner, every subsequent file from that content owner will be automatically processed in the same way.

Thus, the dynamic transcoding profiles are set for each of the media file types based on the metadata settings from the original delivery of the raw media input file. Transcoding profiles may be adjusted in real-time based on the raw input media file delivered. The transcoding profiles prevent automatic upscaling of video to higher resolutions, prevent bitrate loss for higher qualities on audio and video, and adjust security flows as needed for digital rights management (DRM), forensic watermarking, fingerprinting, etc.

The content owner may include instructions for the streaming service provider regarding what security to incorporate into the output video file, if there are different viewing groups, if there are different amounts of viewing time for the different viewing groups, etc. These instructions may be in any readable format. However, the video management system may accept any standard format such as an XML file and the content owner may provide the information needed for the output media file.

Once the raw media input file is processed to create the output media file with the desired security features, and the raw metadata is converted to usable metadata, the output media file may be uploaded to the CDN and registered. Once the file is registered, it is available for viewing on the streaming service based on the availability dates and other relevant criteria in the metadata.

Another feature of the first embodiment is the handling of files from a particular content owner. Instructions may be modified in a manner that is not present in the prior art. For example, a content owner may determine an entitlement period when a particular output media file is available for viewing. However, even during the entitlement period, the content owner may need to change it. The content owner only has to send new instructions and the system will update the entitlement period without intervention by a system operator. In the first embodiment, the new instructions may be sent from the content owner by email.

Another example of automation of the system is the automatic updating of output media files when needed. Consider a raw input media file that has been uploaded to the video management system, but it contains an error in an end credit. The client only has to send an updated raw input media file with the corrected video and the typical email instructions to replace the output media file that is currently available for viewing. In the first embodiment, no action is taken by a system operator. Instead, the new raw input media file is received, processed, the old output media file is disabled, the new output media file is enabled, and then information in the metadata is updated.

Once the data (the output media file and the metadata) is uploaded to one or more CDN servers, a verification of the output media file may be performed on all uploaded files such as a checksum computation. A predetermined number of days after receiving the raw input media file, the raw input media file is deleted from the video management system, leaving only the output media file on the CDN. This deletion of the raw input media file may be done for security concerns. The first embodiment typically deletes the raw input media file after three days, but it may be any number of days.

A situation may now arise where a change needs to be made in the output media file. For example, someone may have noticed that there is a misspelling in the credits of a movie or television show stored in the output media file. The only way to fix the output media file is to correct the error in the raw input media file and send the corrected raw input media file to the video management system for reprocessing. The content owner would typically include an XML file with the same instructions. The video management system will process the raw input media file and generate a new output media file, delete the first output media file, and upload the new output media file to the CDN.

It is noted that the automation of the video management system does not require streaming service provider intervention in the updating of the output media file. The video management system is fully automated to receive the new raw video and instructions and perform the processing, deletion, and uploading without assistance.

Consider the scenario where there is no flaw in the output media file, but the content owner wants to change the dates of availability of the output media file for viewing. The output media file does not require replacement, so the content owner only needs to send a new instruction file (in any appropriate format such as XML, JSON, text, database, etc.) with changed dates of availability. The video management system receives the new XML file and updates the metadata for the output media file with the new dates of availability. Again, no intervention by the streaming service provider is required to update this information.

Security of the output media file is still a concern of the streaming service provider even though the raw input media file has been deleted from the system. Accordingly, once the output media file is processed and ready for viewing it may be encrypted using the AES-256 encryption standard, or any other encryption standard.

Once the availability date for the output media file has expired, after a preselected number of days after expiration the output media file is deleted from the CDN where it was being stored and the cache on the CDN where it was stored is flushed to prevent any trace of the output media file from remaining on the CDN. In the first embodiment of the invention, the output media files may be automatically deleted five days after availability expiration.

One of the useful features of the first embodiment is the ability to create groups of viewers and to have different dates of availability for each group. The content owner can create the groups and assign the different dates of availability of the output media file using the instructions sent to the streaming service provider using the instruction file. Dates of availability may also be referred to as entitlements of a group of viewers.

Another advantage of the first embodiment is careful management of storage space on the CDN. There are prior art systems that keep a unique copy of an output media file for each of the different groups, just because each group has a unique set of availability dates. In contrast, the first embodiment only keeps a single output media file as long as the same media content is available for all the groups.

It was noted that one of the big advantages of the first embodiment is that raw video and live streaming may both be processed and managed by the video management system. Another feature is that the first embodiment may also record a live streaming event. The live streaming event then becomes raw video that may be processed like any other video file and made available for streaming on demand.

Security is another feature of the first embodiment. The prior art fails to add any security features such as DRM, forensic watermarking or fingerprinting until after a raw video is received by a video management system.

In contrast, the first embodiment may add security features during file ingestion. This means that the raw video is never in the possession of the streaming service provider before security features can be added. The content owner may choose not to add any security features and thus the raw video is unprotected. However, if the content owner wants to add any security features, these features are added as the raw video is processed. After the raw video is processed and any security features are added, a next level of security is added to all output media files in the form of the selected encryption format. Thus, the first embodiment may add multiple forms of security to the output media files and is never in possession of a raw input media file with no security features if the content owner wants any of them to be added during file ingestion.

FIG. 1 is provided as a flowchart of the method of using the first embodiment of the invention. The method includes the steps of 1) receiving instructions and raw input media files from the content owner, 2) creating a dynamic transcoding profile, 3) ingesting raw input media files and adding security features if requested by content owner, 4) converting raw metadata into usable metadata, 5) creating output media file using the dynamic transcoding profile, 6) performing encryption (e.g. AES-256, etc.) on output media file, 7) uploading output media file to CDN, 8) performing the verification, such as by a checksum, on all files uploaded to CDN, 9) registering the output media file based on availability dates in metadata, and 10) deleting output media file from CDN a predetermined number of days after availability expiration of all the groups availability has expired.

There may be some adjustment to the method shown in FIG. 1 as some steps may not need to be performed, such as when the content owner does not want any security features added to the raw input media files other than the encryption, such as AES-256, which is performed on all output media files. Some steps might also be performed in a different order without departing from the scope of the first embodiment of the invention.

In addition, there may be additional steps added to the method, for example, when it is necessary to replace the output media file with an updated version or when an update is needed in the dates for availability as stored in the metadata.

FIG. 2 shows an updated method as shown in FIG. 1 that now takes into account the steps in the method when a modification is made to the output media file that has already been uploaded to the CDN and when only metadata needs updating such as when dates of availability of the output media file have changed. In this case the method has entered a loop after performing Steps A, B, and C from FIG. 1. The next step is to determine if any new instructions are received. If not, then the next step is to determine if the availability of the output media file has expired. If not, then the method continues in this loop until either new instructions are received or the availability of the output media has expired.

It should be remembered that the same output media file may be used for a plurality of different viewing groups. The different viewing groups may have different viewing dates. The output media files is kept until the expiration date has passed for all of the different viewing groups.

If new instructions are received, the next step is to determine if the raw input media files needs to be reprocessed and the current output media file replaced. If not, then the metadata needs updating without replacing the output media file, and the loop returns to the step of determining if new instructions have been received.

However, if updated raw video does need processing, then the next step is to perform the group of steps defined as Steps B from FIG. 1. Steps B processes the new raw input media file that was received from the content owner, converts the raw metadata into usable metadata, creates the output media file, and then encrypts the output media file. The next step is to remove the current output media file and then perform the group of steps defined as Steps C from FIG. 1. The new encrypted output media file is uploaded to the CDN and then registered based on the availability dates of the metadata.

The process then returns to the loop of checking for new instructions and checking if the availability date or dates have expired for the current output media file.

Figure 3:
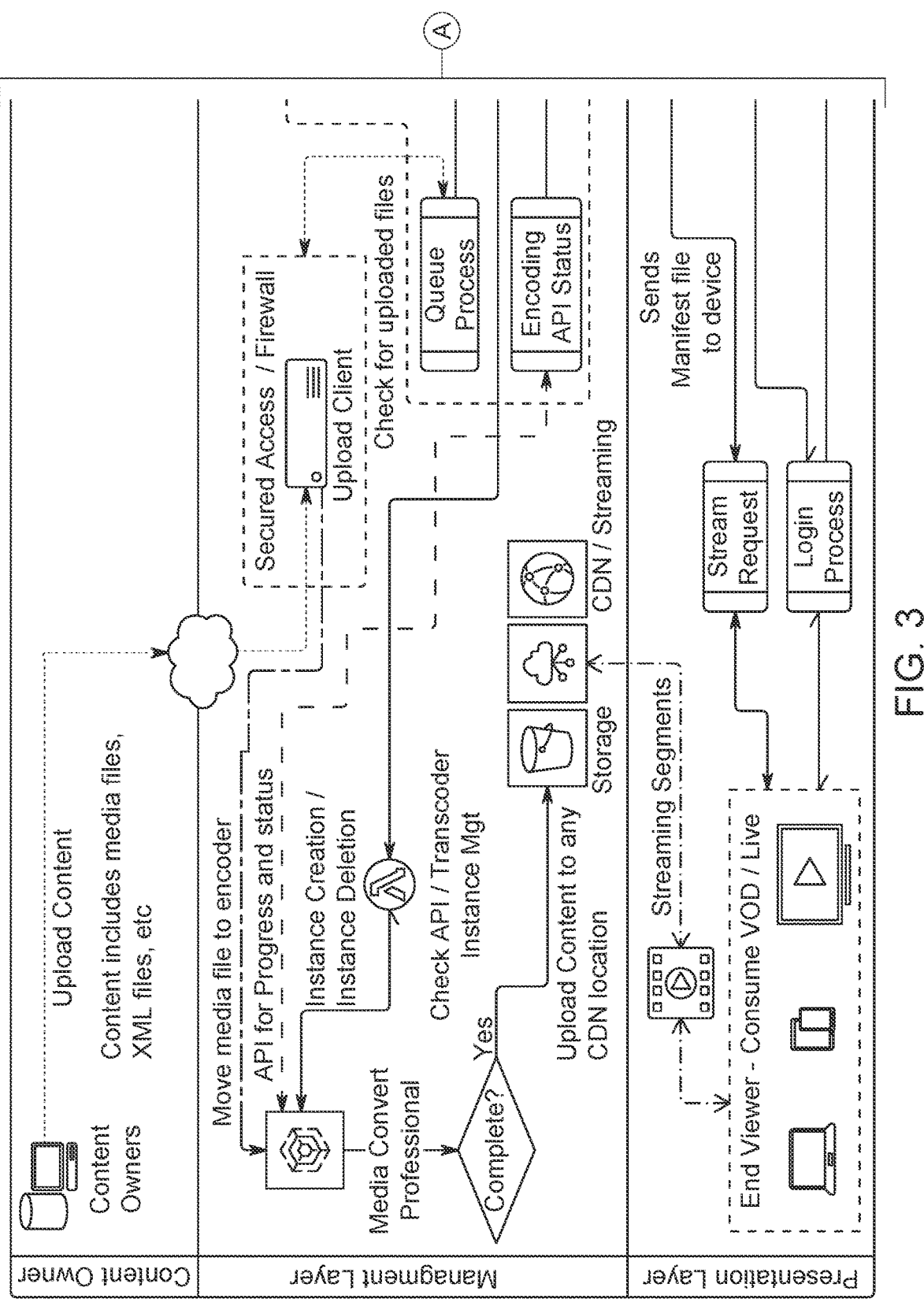
FIG. 3 is a block diagram of a high level overview of the step in FIG. 1 of initial ingestion of the raw media input files and creation of the output media file.
Figure 3:
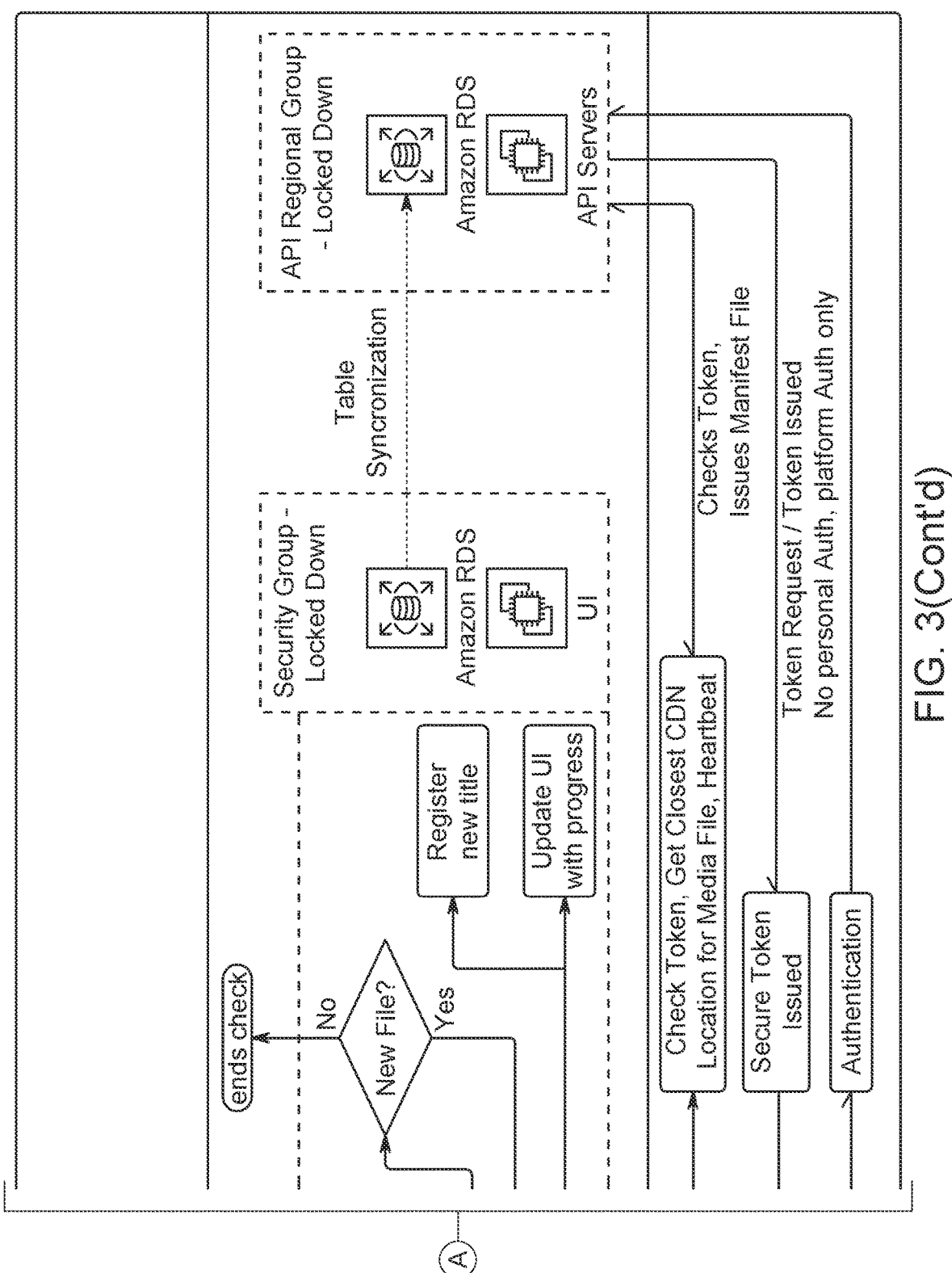

FIG. 3 is provided as a block diagram of a high level overview of the steps in FIG. 1 of initial ingestion of the raw input media file and creation of the output media file. FIG. 3 shows that the method operates in three sections or layers. The first layer is where the content owner sends or uploads content (the raw input media file or files) to the video management system.

The second layer is the management layer where the raw input media file is processed to create the output media file which is then uploaded to the CDN where it can be accessed.

The third and final layer is the presentation layer where the uploaded and stored output media file on the CDN is accessed by a customer of the streaming service provider according to the rules as stored in the metadata.

The video management system of the first embodiment may be created for a single client or content owner or for multiple content owners. The video management system of the first embodiment may have initial configurations that are set to manage, maintain, and direct all the information being exchanged between a content owner and the video management system. This initial configuration includes setting up a feature set for the content owner, enabling and disabling options for the content owner, default dynamic transcoding profiles for the video management system, security levels allowed, and digital ad insertion (DAI) properties at a video management system level.

The video management system may be set up as a multi-content owner system or a single content owner system. With multi-content owner, the video management system segregates and isolates data between multiple content owners using the same video management system. Each content owner has all data saved with a unique token/ encryption for that content owner. In contrast, when there is only a single content owner, no other content owner companies are allowed to be created and the single content owner has all data encrypted with a platform key unique to that installation of the video management system.

All databases storing data, for multi-content owners or a single content owner, use an auto-scale implementation to handle various loads and volumes.

In account configuration and settings, a management console allows for the unique setup and configuration of individual content owners to have access to the video management system, isolate the data and set up their custom configuration. This is done to minimize the technical expertise that is needed for the person using the video management system.

Figure 4:
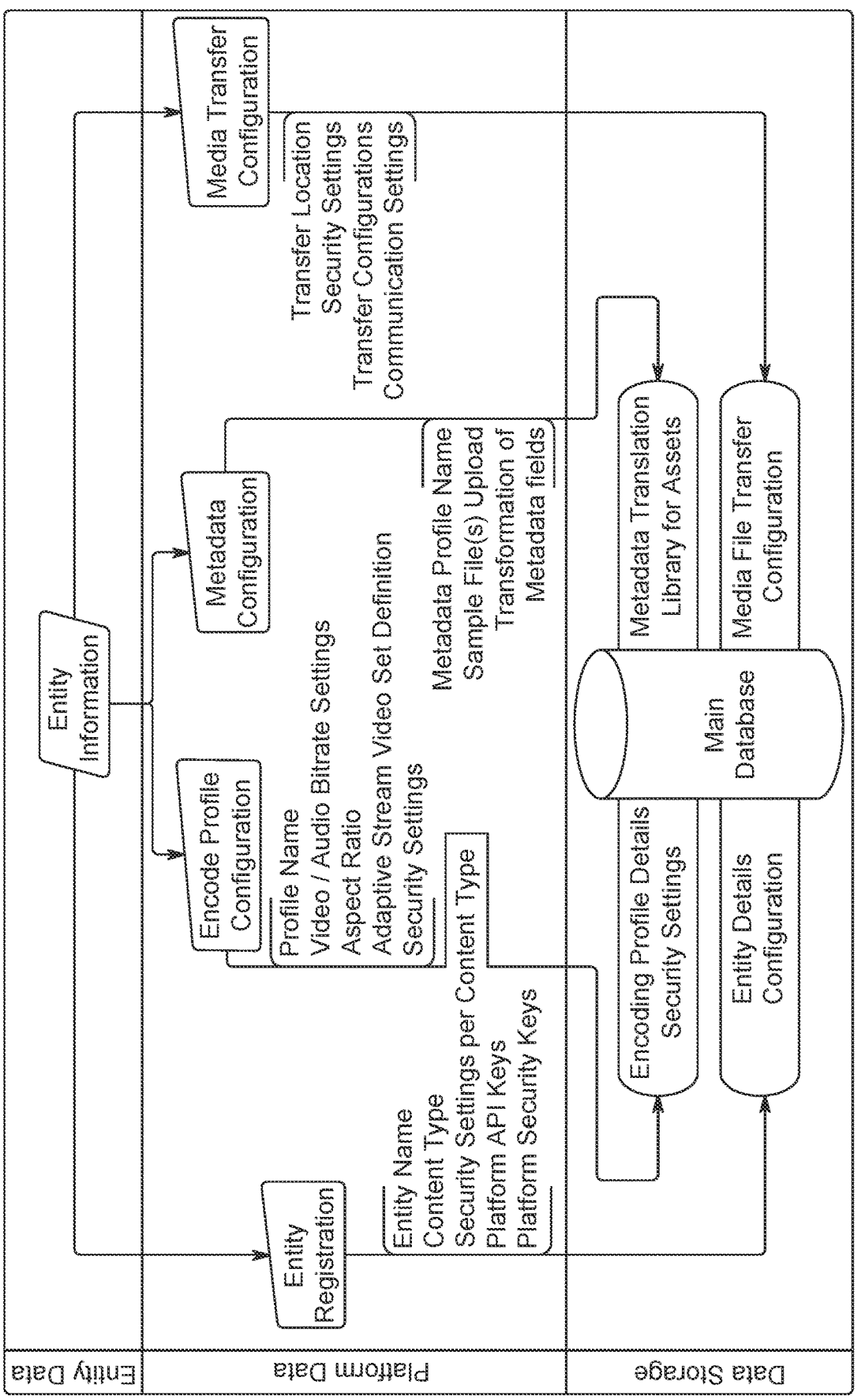
FIG. 4 is a block diagram of Client setup in the video management system.

FIG. 4 is a block diagram of client setup process in the video management system. This client is then granted certain access rights, security allowances, video management system access, and workflows are then automatically set up in the back-end systems.

A client is initially set up to include a location to upload content and media files, an initial set of transcoding profiles, and a single sub-client or Catalogue.

Each client can have one or many catalogues. These catalogues may segment the media content for VOD and Linear to various groups, including access rights, availability date ranges and certain metadata. Multiple catalogues will use the same media set but may display and deliver these media sets in a different fashion.

Accounts are set up and associated to the client and given access restrictions for the account. Each account can have certain access and restrictions as needed for the purposes of that account.

The roles in a particular account are as follows:

Admin—Full access to their client, usually Technical

Regular User—Semi-technical, but has access to manage and maintain Client

Reader—Can see Client platform areas, cannot administer, or manage any part

Content Manager—Non-technical, can manage content metadata only

Reporter—Can access reports, analytics, and data monitoring, non-technical

Tester—Can only access the test area for testing of content

Services Tester—Can only access the testing area for the communication services for platforms (APIs)

Each Role may be limited to a certain catalogue or catalogues. Each account, when assigned a role can be given access to all catalogues, or just specific catalogues. These roles will only provide them access to the data for the catalogue(s) allowed.

Default dynamic transcoding profiles set up at the video management system level will be inherited at the client level. From this, each client is allowed to either customize an existing dynamic transcoding profile set or create new ones. To create new ones, they do not need to know technical aspects of transcoding. The user can just select a type of profile to add, or they can get to the details to change video bitrate, audio bitrate or any other properties that the media file will need, like aspect ratio, frame rate, or other properties.

This is completed via an interface provided by the video management system. It allows the user to use sliders or any desired interface components to adjust the dynamic transcoding profiles while providing them the information on each size, type of change and type of setting in layman's terms.

Figure 5:
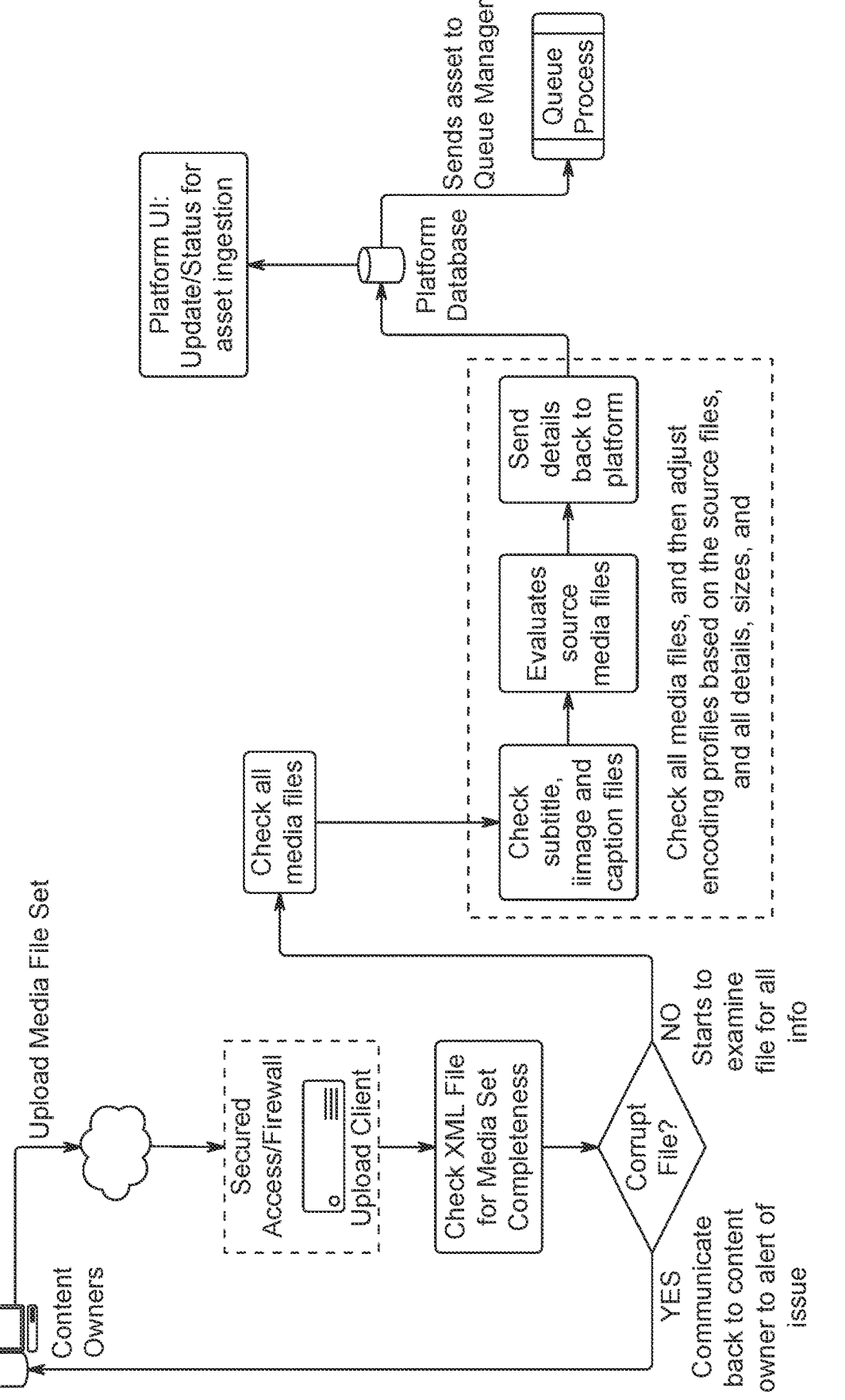
FIG. 5 is a block diagram showing the method of file and metadata ingestion.

Original video transport/ingestion is shown in FIG. 5. FIG. 5 is a block diagram showing the method of raw input media file and metadata ingestion. All raw input media files are transported to the video management system using varied methods. These include accelerated transfer systems like Aspera or Signiant; or using traditional FTP/SFTP methods. All raw input media files are sent to the video management system in a secured location with one way access. The raw input media file can be uploaded but not downloaded. Security is placed on each raw input media file, and each raw input media file is encrypted at rest.

Once input of a raw input media file is complete, the video management system looks for an instruction document to accompany the media file(s). This instruction file may provide details on the file for the system to check and validate the file. This is done to determine the integrity of the file(s) and prepare audio for transformation and video for transcoding. These instructions may become part of the metadata.

The video management system will register the raw input media files and metadata in the video management system. This includes video files, audio files, subtitle/caption files, text cards/placards and other information files that may be included in the instructions. All the metadata is then set for transcoding based on the instruction document that may be in the form of an XML document.

If there is no XML document, the video management system may use a default transcoding profile set up for the content owner. If there is no default profile for the content owner, it will revert to the default profile for the video management system. This video management system default profile is always available to all content owners in the case that there are issues in determining which transcoding profile to select.

All raw input media files are saved in the system for a predetermined number of days. For example, a default setting of the video management system is to store the raw input media files for seven (7) calendar days in the event that the transcoded and transformed output media file is corrupted, or errors happen in the video management system. After seven days, the raw input media files are then automatically deleted from the video management system. The platform will not store, save or backup any raw input media files in order to ensure the security of the content owner's files.

Figure 6:
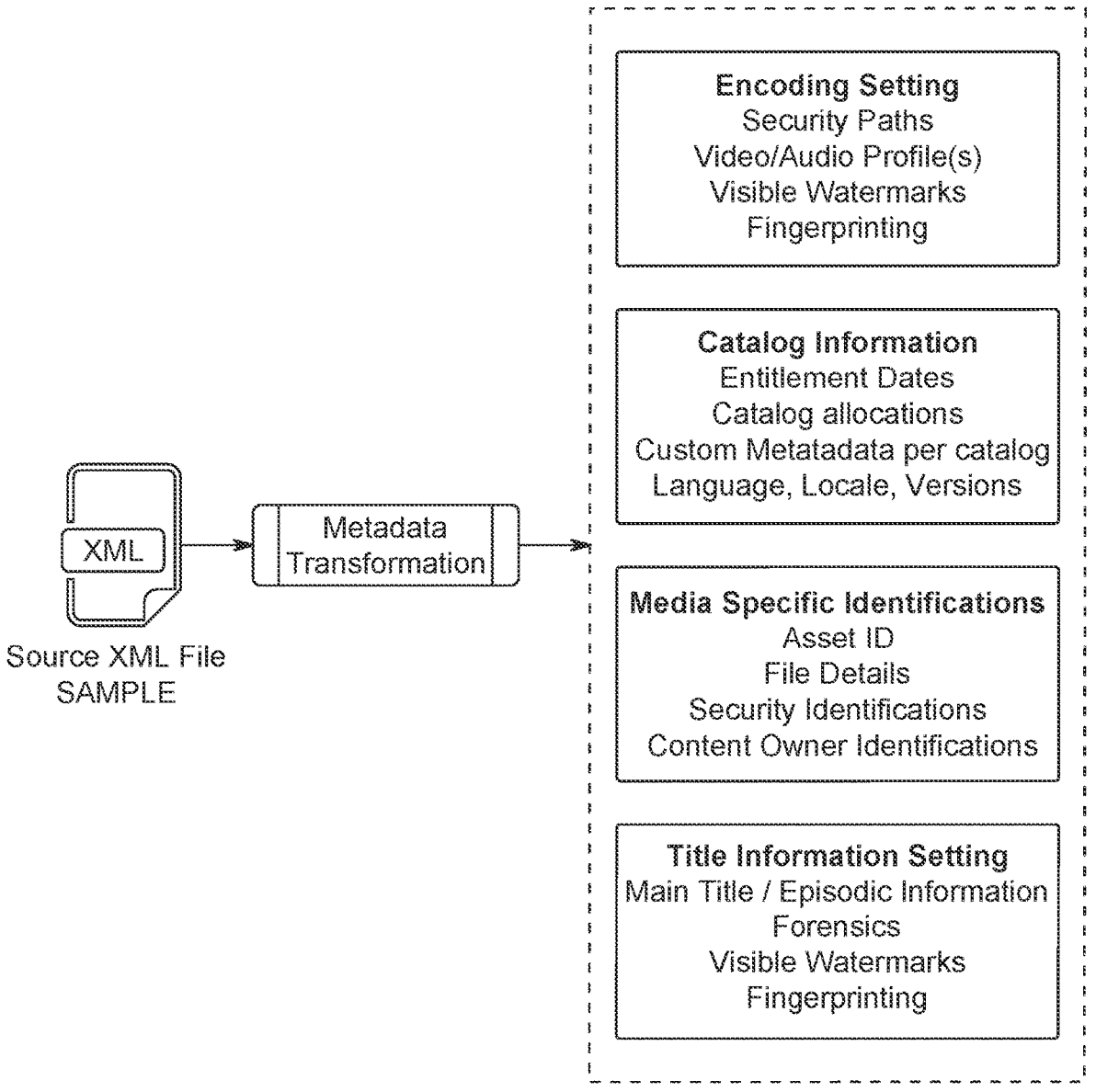
FIG. 6 is a block diagram showing an overview of metadata transformation.

Metadata Translation/Transformation: FIG. 6 is a block diagram showing an overview of metadata transformation. All metadata is sent via an XML or other type of instruction file. This XML file may be in any format; all fields, names, IDs, and other items can be specific to the content owner and does not need to be standardized.

Upon onboarding of a new content owner, sample raw input media files including an XML file is sent to the video management system. The video management system admin will then import the XML file to the video management system. The video management system will analyze the file, and extract all names, IDs, and values in each node of the XML file. The admin will then use that extrapolation to match to fields, settings and configurations needed for creation and management of the output media file and its associated metadata.

All metadata is now matched to the video management system standards. There is no need for the content owner to change their process in creating and sending the raw input media files with the XML data. The video management system will take that initial file, and after the admin matches this up to the platform standards, all future deliveries will be automatically parsed and matched as needed.

This will also direct the transcoding process to the security level needed. The content provider can then determine which raw input media files need a stricter security setting when delivering them to the video management system. There is no need for further manual intervention after the initial set up, as the video management system will transform all data from the XML file as needed for the platform to build the metadata for the raw input media files and set them up for transcoding and then preparing for streaming.

All changes to existing raw input media files already ingested into the video management system only require a new XML file to be loaded the same way as the raw input media files. The new XML document is recorded in the video management system, and based on the data in the XML document, the video management system will find the raw input media files in the system, update any data that is needed, and update the catalog showing the output media file is updated.

Among the data that can be defined in this XML document is the following: 1) Entitlement date range: allowable dates for audience to view the output media file, 2) Title: including movies, series, special, events, etc., 3) Episodic information: including episode titles, series events, special groupings, etc., 4) Content Description: short description, summary/synopsis, event information, etc., 4) Talent Information: actors, actresses, directors, producers, etc., 5) Ratings Information: US ratings, Canadian Ratings, EU Ratings, etc., 6) Content Owners: Channel owner, studio, distributors, etc., 7) Security settings: Clear (no DRM/security), Encryption, DRM, Device Hardening, Forensic Watermarking, Visible Watermarking, Fingerprinting (These options can be cumulative or individual selections, such as Clear+Fingerprinting+Visible Watermarking), 8) Media File information: including all files packaged, video file details, audio file details, file verification (e.g., checksum, etc.), 9) Support email: contact email that can be used for the file specifically for that raw input media file, 10) Special Identifiers/Trackers: Content Provider internal asset IDs, industry standard identifiers, Gracenote information, etc., 11) Image information: included image details with either a pointer to a poster/still image or the preferred image included in the raw input media files.

Video Transformation/Security Additions: All transcoding processes are on an auto-scale configuration. Instances in the cloud provider(s) are set up when the video management system is installed. Once the instance image is set, multiple instances can be created to meet demand of the queue. The maximum instances and minimum instances can be set in the video management system. The default minimum is 0 instances, and the maximum is set based on the cloud provider limits, which is pulled in automatically. If a client only wants the auto-scale to burst to ten (10) instances, this may be set in the video management system. The video management system will then only start up that limit to process all media file sets in the queue.

As raw input media files are delivered, the video management system will check these and queue these in the video management system for processing. This uses a mixture of the settings sent in with the XML file and the actual raw input media files that are delivered.

The queueing system is a first in/first out system. The video management system allows for priority ordering in the queue. This can be set automatically on the content owner level or can be done manually using the interface. If the queue has multiple items backed up and a specific raw input media file is needed sooner, the video management system allows for that raw input media file to be bumped to the front of the queue for processing.

When the raw input media file is picked up by the video management system for processing, it checks the transcoding profile that is set for the raw input media file, then checks the video/audio file(s) for the details. The video management system will automatically process the raw input media file based on the top file size based on the transcoding profile setting and the media file(s).

For example, if a raw input media file is sent in and the top size is a 1280×720, but the transcoding profile is for an adaptive profile with the highest quality at 1080p, the transcoding process will not encode the profiles above the source file size. This is true for smaller video files and older files that may be in a different aspect ratio and size. The video management system will always encode the files (both video and audio) to the top quality of the source file. This includes bitrate, aspect, ratio, and color depth, etc.

Cataloging/Management of raw input media files: Each raw input media file is broken into three categories to define the raw input media file:

Media Information
    Defines the actual raw input media file
    Asset ID
    File information
    Audio/Video details, transcoding information
    Security settings

US 12,581,137 B2

13

Title Information
    Defines the content details
    Title, episode data
    Synopsis, details, talent
    Title industry data
    Ratings, parental advisories
Catalog Information
    Defines the catalog allocation
    Entitlement dates
    Catalogs/Groups allowed to access the content
    Catalog specific title details
    Catalog specific player/platform allowances
    The video management system allows for the management of each area. In each area, the video management system will transform base metadata information and catalog the raw input media files accordingly.
    The entitlement date range is set by the content owner. Once the end date is reached, the output media file is no longer allowed on any systems or catalogs. After a predetermined number of days, the output media file is deleted from the CDN and the video management system. If the output media file is needed again, a new delivery is needed of the raw input media file to enable this and thereby ensure that the content owner's rights are preserved.
    If the output media file is updated, a new media raw input media file is delivered. The video management system will evaluate the new raw input media file and match any existing Title data and create a new Media record, and associate this to the existing Title data, and create a new Catalog entitlement. The video management system also manages the multiple updates of assets so that usage statistics can be combined for measurement and reporting services.
    Title Information can have multiple Media Information entries and multiple Catalog Information entries. The Title is the main information for each raw input media file. Once the raw input media file is sent to the video management system, the Title Information is created if it does not already exist. The Title is saved in perpetuity in the video management system. This is associated to the content owner.
    The actual media files and encoded files can be deleted, but the Title information will always be maintained for the content owner.
    Each Title can be assigned to a Catalog or multiple Catalogs. The Catalog may group a targeted audience for the output media file and can allow access to the output media file for different durations as directed by the content owners. Content Owners may define entitlement dates in the XML that will match up to predefined catalog/groups. Each group may be assigned viewing dates independently of other groupings/catalogs. The video management system will take any information provided in the XML and assign the entitlement date ranges to the associated Catalogs.
    The video management system allows for automated or manual updates of the metadata and Catalog or Title information. The Media Information is always set based on the media files delivered to the system.
    Live TV/Live Streaming Management: The video management system also handles management of Live Streaming/Internet Broadcasting of linear channels. This is managed differently, including the DASH and HLS source locations/source endpoints, the DRM Protection endpoints, and the metadata for the channel/live stream. These can be continuous or special events/limited stream events.
    Content owners may provide the metadata feeds from various endpoints. Gracenote is the industry common standard for linear (continuous) streaming for traditional television content. The video management system allows for custom metadata endpoints in either XML or JSON format.
    An endpoint is provided to the video management system, and the admin can go into the endpoint, pull in the document(s) or data, and then match all data to the platform standard. All data provided from the content owner/distributor is then ingested in the video management system and aligned to video management system formats and naming conventions. Once that is saved, the video management system will then regularly check the endpoint for new content data, and either ingest new data or update existing data in the video management system. This data is then provided to the apps via an API for channel/guide information.
    The process flow is as follows:
    1) Sample source XML or JSON document uploaded/ingested in the video management system
    2) Data matching is done on each element in the sample to video management system data
    3) All video management system data is now in the format needed to deliver to end user applications
    4) Regular communication with source endpoint to pull new data for programming
    5) Video management system transforms the data as needed to provide ad hoc to applications
    Digital Ad Insertion (DAI) metadata for the streaming of the output media file is handled in a similar way. An ad partner can keep their existing naming convention for the information needed to serve ads. The video management system will get a sample of the naming convention and then match this to the standardized platform format. Once matched up, the video management system will transform all requests made from applications to the convention needed by each ad partner to serve ads in the output media file.
    The first embodiment of the invention may be a computer program that is running on one or more computers. These one or more computers have Internet access and access to the CDN. The type of computer that is running the first embodiment of the invention is not considered a limiting element of the invention. Any computer that is capable of executing the video management system described in the first embodiment of the invention will suffice.
    Similarly, video streaming services that provide live video streaming and video on demand are well known in the art and are not considered an element of the invention but are only referred to in that they provide such services, and those services are improved because of the system and methods taught herein. The specific manner in which those services are provided and the equipment that is used to provide those services are also not considered an element of the invention and are well known in the art. Video streaming services are only referred to in order to provide a reference for use of the video management system that is described in the first embodiment of the invention.
    At a minimum, the first embodiment of the invention is a method for providing video on demand on a video streaming service, said method comprising: receiving a raw video file, receiving instructions for the raw media file in an XML file, ingesting the raw video file and adding security features as instructed in the instructions, processing the raw video file to generate an output media file, wherein the output media file is at the highest video resolution and best audio format that is possible for the raw video file, converting raw metadata from the raw video file into usable metadata, uploading the output media file to a content delivery network (CDN) server, and registering the output media file and making the output media file available for streaming from the video streaming service.

It was previously explained that the video management system of the first embodiment integrates management of both live streaming content and video file content. This ability to manage both live streaming and video on demand is not a trivial matter and has been avoided by the industry for several reasons.

For example, the source of the data is substantially different for the two types of assets. Streaming assets are generally prepared in a manner such that ads may be easily inserted, and output formats are adaptable to network requirements. Thus, the source data may be 720p but the network output requirement is 1080i.

Live streaming sources are generally going to come from a singular source such as a camera, a satellite, or some other source that has a large bandwidth signal. In addition, the source signal is generally not going to be compressed and is often an interlaced signal and not a progressive signal. An interlaced signal is going to be more difficult to manage because of the need to display the even lines and then the odd lines of a signal.

Accordingly, transcoding an interlaced signal is different from a progressive signal. While both live streaming and VOD may handle ads in a similar manner by using markers to show ad breaks and length of the break. However, the transcoding process is different and thus the first embodiment is essentially the joining of two different transcoding systems in a single video management system.

Another important realization of a critical difference between live streaming and VOD is that live streaming requires transcoding of the signal in real-time or on-the-fly. A lot of resources are required in order to take the source data and process it to an adaptive profile. As many viewers of a live streaming event will be watching an event live, all qualities of video in the profile have to be available. Therefore, the system performs a light transcoding on the source stream to provide these various quality streams, and these streams are then output in the form of an output media file to a CDN location to help with the delivery of the source.

An example of the various video qualities that may need to be available for an output media file that is output may be comprised of a standard adaptive stream file set. The standard adaptive stream file set may consist of the video files, the audio files, and any text files for captioning or subtitles. An example of a file set for an output media file is shown as Table 1 in FIG. 7. It should be understood that the list shown in Table 1 is only an example and may be modified as needed for a specific desired output quality of the output media file.

Table 1 shown in FIG. 7 may be a VOD asset file set, that has audio for English and Spanish, and captions for English, Spanish and French. All of the files are referenced in Manifest files. DASH is used for non-Apple devices, and HLS is used by Apple devices/browsers. The files may vary due to the DRM that needs to be applied to each one. For example, Apple has FairPlay DRM, which can only be used on Apple devices. In contrast, DASH uses Widevine, which is used for non-Apple devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for providing a video management system for managing both live streaming and raw input media content in a single video management system, said method comprising:

receiving media content that is either a live streaming signal or a raw input media file in the video management system from a first content owner;

creating a dynamic transcoding profile for the media content to thereby preserve the highest quality of video resolution and audio quality of the media content by keeping an original video resolution of the media content and never automatically upscaling or downscaling the original video resolution;

receiving the media content from a first content owner;

applying security to the media content if requested by the first content owner as it is ingested by the video management system, wherein the live streaming signal is recorded by the video management system to create a raw input media file;

creating an output media file from the media content using the dynamic transcoding profile;

encrypting the output media file;

uploading the output media file to a content delivery network (CDN);

converting raw metadata from the media content into usable metadata for the output media file;

streaming the output media file content from a video streaming service;

providing a plurality of different viewing groups for the output media file;

providing a unique expiration date for each of the different viewing groups;

using a single copy of the output media file in the CDN for all of the different viewing groups to thereby decrease the space being used in the CDN by the output media file;

receiving instructions for who can view the output media file and an expiration date of the output media file from the first content owner in a separate instruction file from the media content;

receiving the media content and the instruction file for the first content owner;

processing the media content and the instruction file and storing the steps of processing;

automatically repeating the steps of processing whenever new media content or a new instruction file is received from the first content owner by the video management system without intervention by an operator of the video management system;

automatically updating the output media file by transmitting new media content, new instructions, or both to the video management system, wherein the output media file is replaced if the new media content is received and updating the metadata if the new instructions are received; and keeping the output media file in the CDN until the expiration date has passed for a last of the different viewing groups.

2. The method as defined in claim 1 wherein the method further comprises deleting any media content from the video management system after the output media file is created to thereby provide increased security for the first content owner.

3. The method as defined in claim 2 wherein the method further comprises deleting the output media file from the CDN and flushing a cache of the CDN after expiration of the output media file.

4. The method as defined in claim 3 wherein the method further comprises performing a verification of the output media file using a checksum computation after the output media file is uploaded to the CDN.

5. The method as defined in claim 4 wherein the method further comprises registering the output media file using an expiration date from the usable metadata such that the output media file is available for viewing.

6. The method as defined in claim 5 wherein the method further comprises providing a video management system that may be used by a single content owner or a plurality of content owners, wherein files of the plurality of content owners are segregated and encrypted to prevent access by other content owners.

7. The method as defined in claim 6 wherein the method of allowing a plurality of content owners to operate the video management system further comprises assigning an individual account to each of the plurality of content owners in the video management system, wherein the individual account has a plurality of roles, wherein the roles have different access to the files in the account.

8. The method as defined in claim 7 wherein the method of providing the plurality of different roles further comprises providing the roles of Admin, regular user, reader, content manager, reporter, tester, and services tester.

9. The method as defined in claim 1 wherein the method further comprises looking for an instruction file after the media file is uploaded to the video management system, wherein the video management system includes a default transcoding profile that is used if the instruction file is not located with the media file.

10. A method for providing video on demand on a video streaming service using a video management system, said method comprising:

providing the video management system that can receive media content that is either a live streaming signal or a raw input media file in the video management system from a first content owner;

creating a dynamic transcoding profile for the media content to thereby preserve the highest quality of video resolution and audio quality of the media content by keeping an original video resolution of the media content and never automatically upscaling or downscaling the original video resolution;

receiving the media content from a first content owner;

applying security to the media content if requested by the first content owner as it is input by the video management system, wherein the live streaming signal is recorded by the video management system to create a raw input media file;

creating an output media file from the media content using the dynamic transcoding profile;

encrypting the output media file;

uploading the output media file to a content delivery network (CDN);

converting raw metadata from the media content into usable metadata for the output media file;

streaming the output media file content from the video streaming service;

providing a plurality of different viewing groups for the output media file;

providing a unique expiration date for each of the different viewing groups;

using a single copy of the output media file in the CDN for all of the different viewing groups to thereby decrease the space being used in the CDN by the output media file;

keeping the output media file in the CDN until the expiration date has passed for a last of the different viewing groups;

receiving instructions for who can view the output media file and an expiration date of the output media file from the first content owner in a separate instruction file from the media content;

receiving the media content and the instruction file for the first content owner;

processing the media content and the instruction file and storing the steps of processing;

automatically repeating the steps of processing whenever new media content or a new instruction file is received from the first content owner by the video management system without intervention by an operator of the video management system; and automatically updating the output media file by transmitting new media content, new instructions, or both to the video management system, wherein the output media file is replaced if the new media content is received and updating the metadata if the new instructions are received.

\* \* \* \* \*